United States Patent [19]

Dettling et al.

[11] Patent Number: 4,649,703
[45] Date of Patent: Mar. 17, 1987

[54] APPARATUS FOR REMOVING SOLID PARTICLES FROM INTERNAL COMBUSTION ENGINE EXHAUST GASES

[75] Inventors: Hubert Dettling, Waiblingen; Hermann Eisele, Vaihingen; Gottlob Haag, Markgroningen; Karl-Heinz Hägele, Vaihingen; Ernst Linder, Mühlacker; Wilhelm Polach, Möglingen, all of Fed. Rep. of Germany

[73] Assignee: Robert Bosch GmbH, Stuttgart, Fed. Rep. of Germany

[21] Appl. No.: 674,820

[22] Filed: Nov. 26, 1984

[30] Foreign Application Priority Data

Feb. 11, 1984 [DE] Fed. Rep. of Germany ....... 3404988
Jun. 30, 1984 [DE] Fed. Rep. of Germany ....... 3424196

[51] Int. Cl.4 ............................ F01N 3/02; B03C 3/14
[52] U.S. Cl. ......................................... 60/275; 60/279; 60/311; 55/124; 55/127; 55/143; 55/152
[58] Field of Search .................... 60/275, 311, 279; 55/124, 127, 143, 152, DIG. 30

[56] References Cited

U.S. PATENT DOCUMENTS

| 2,667,942 | 2/1954 | Wintermute | 55/127 |
| 3,439,476 | 4/1969 | Knight | 55/127 |
| 4,478,613 | 10/1984 | Brettschneider | 60/275 |

FOREIGN PATENT DOCUMENTS

| 858692 | 12/1952 | Fed. Rep. of Germany | 55/152 |
| 1022714 | 3/1966 | United Kingdom | 60/275 |

Primary Examiner—Douglas Hart
Attorney, Agent, or Firm—Edwin E. Greigg

[57] ABSTRACT

An apparatus for removing solid particles from internal combustion engine exhaust gases is proposed, in which the flow of exhaust gas travels at a high speed of more than 2.5 m/sec through an elongated tube (4), in which a corona discharge takes place from a coaxial spray disk/electrode arrangement toward the wall of the tube. Inside the tube, the soot particles are agglomerated to form larger particles, which are not deposited on the walls because of the high flow speed, which then carries them to a centrifugal precipitator, leading away from which are a tube carrying scrubbed exhaust gas and an outlet having a small quantity of exhaust gas highly enriched with soot. This soot-enriched flow of exhaust gas can advantageously be recirculated to the intake side of the associated engine for afterburning.

25 Claims, 5 Drawing Figures

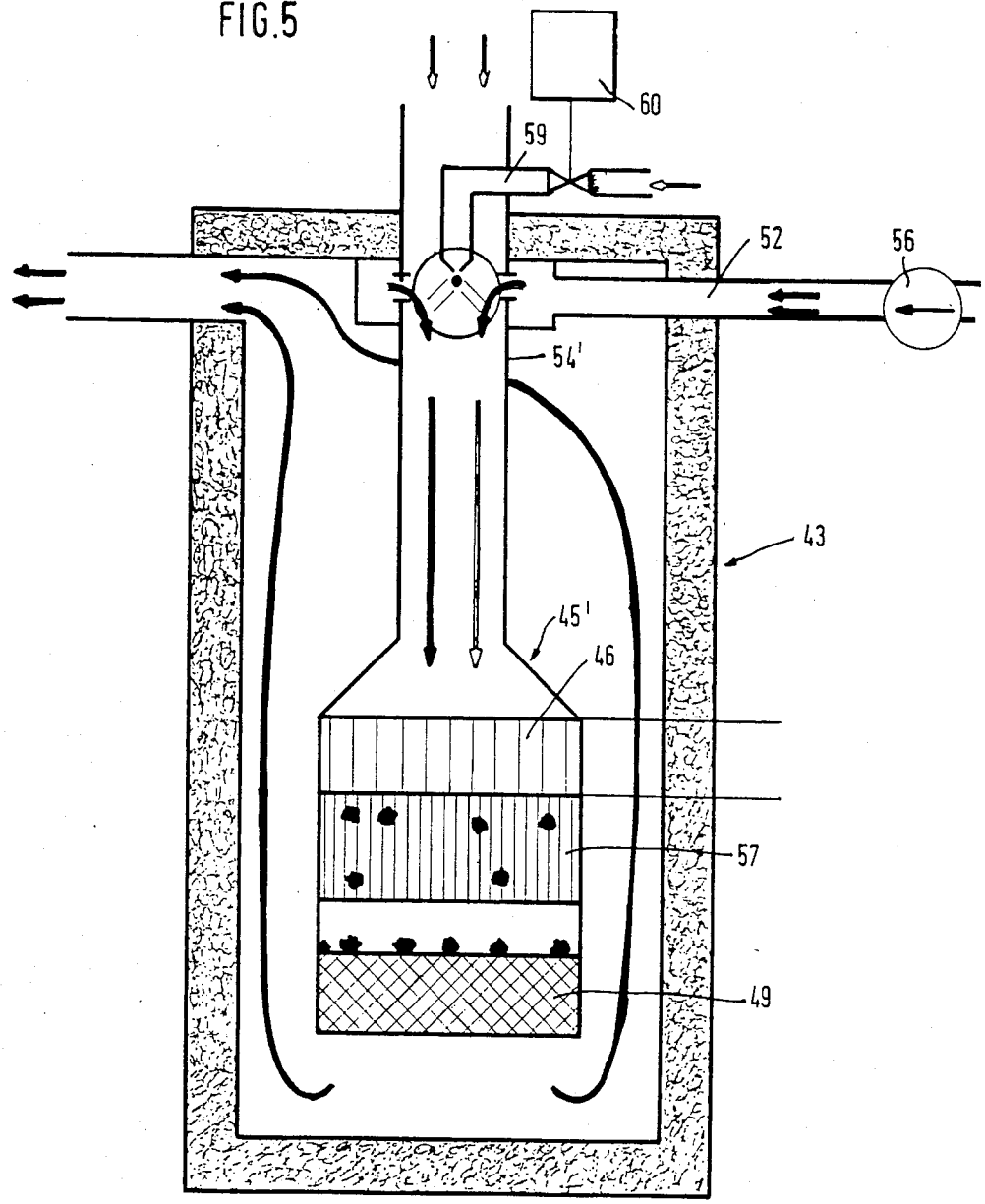

APPARATUS FOR REMOVING SOLID PARTICLES FROM INTERNAL COMBUSTION ENGINE EXHAUST GASES

BACKGROUND OF THE INVENTION

The invention is based on an apparatus for removing solid particles from internal combustion engine exhaust gases as disclosed hereinafter. In a known apparatus designed for this purpose, i.e., U.S. Pat. No. 4,478,613 there are a bundle of tubes, into each of which an electrode support is coaxially introduced, with electrode discharge disks being lined up quite close together on the electrode support. At the front end the tubes are exposed to exhaust gas, which flows longitudinally through the tubes and is discharged into a collecting chamber, from whence it is carried via a connecting line to a cyclone precipitator.

In the tubes, the soot which initially is very finely distributed is supposed to be charged by means of a corona discharge and to precipitate out on the walls of the tubes. As soon as large flakes or soot particles have accumulated on the walls and the layer of soot has grown to a predetermined thickness, the layer breaks off in flake-like pieces, and the resultant large soot flakes are carried along by the flow of exhaust gas and transported to the cyclone precipitator, where they are mechanically filtered out by centrifugal force. The known apparatus thus operates with a relatively low exhaust gas flow speed inside the tubes. In particular, according to proposals made in the known apparatus, the layer of soot is also supposed to be loosened with the aid of mechanical means, such as shaking or blowing devices. This occasions relatively great expense, and furthermore the apparatus occupies a great deal of space, so that in motor vehicles, especially passenger vehicles, operated with internal combustion engines the emissions of which are supposed to be kept free of soot components in particular, the apparatus is difficult to accommodate.

A further problem in the known apparatus is that the insulation, by way of which the supports are connected to the apparatus housing such that they are resistant to high-voltage and by way of which the supply of voltage from a high-voltage source is effected, experiences the flow of exhaust gas directly, especially the exhaust gas containing soot components in the form of large flakes, so the insulator surface rapidly becomes soiled. This soiling causes a considerable decrease in shunt resistance, so a considerable amount of energy can travel via the soot layer toward the housing during operation, greatly increasing the power requirements of the high-voltage system. Since the high-voltage system must be supplied by the engine with which the motor vehicle is being driven, the relative fuel consumption for such motor vehicles also increases to a marked extent, because of the power drawn for the high-voltage system. In the known apparatus, discontinuous operation may also occur, because soot components are periodically deposited on the tube walls and are then periodically removed, causing periodically increasing and decreasing amounts of soot to be filtered and possibly causing temporary overloading of the cyclone precipitator. Especially in cases where the soot that has been filtered out is returned to the intake side of the engine, so as to be afterburned there together with the fresh mixture, this kind of pulsating recirculation has a negative effect on the operation of the engine, especially on the result of combustion.

OBJECT AND SUMMARY OF THE INVENTION

The apparatus according to the invention has the advantage over the prior art that the high-voltage power requirement in the electrostatic portion of the apparatus, which may also be called an electrostatic filter, is reduced, because the process of enlarging the size of the particles is intensified by the high flow rate, as will be described in greater detail below. Furthermore, because of the high flow speed, a relatively small structure is attained, in fact one which is comparable in its order of magnitude to exhaust gas noise dampers, that is, mufflers, in conventional passenger vehicles. Above all, an elongated, narrow structure becomes possible. The apparatus can then be installed in the place of a muffler, in which case the apparatus then performs some noise-muffling functions as well. The high flow speed furthermore increases the constancy of functioning, and the functional reliability in general, as compared with the known apparatus. The flow of exhaust gas is uniformly distributed over a relatively small flowthrough cross section of constant size. The total volume of the apparatus experiences a uniform flow of gas through it and is fully utilized. The high flow speed causes a steady blowing out of the soot and the resultant larger soot particles, yet these particles do not become deposited on the walls in great quantities. A pulsating removal of soot particles is thereby prevented from causing a pulsation in the quantity of soot recirculated while soot removal is is taking place via the combustion chambers of the engine. The spontaneous advancement of the soot particles also prevents them from being deposited on the electrodes, thereby reducing the tendency on the part of the electrostatic filter to generate voltage surges when the spacing between electrodes lessens because of the thickness of the soot deposits. Temporary and repeated failures of the filter caused by voltage disruptions because of such surges are substantially avoided.

Further improvements and advantageous embodiments of this invention are revealed herein and finally claimed. For example, because of the induced swirl flow, the soot in the exhaust gas is kept in the outer zones, and the formation of relatively thick layers of soot is prevented from accumulating on the insulators. The high flow speed helps to further counteract such deposits. The insulation resistances at a given structural size can thus be kept large, so that only small amounts of high-voltage power are diverted via the shunt, and the efficiency of the system is increased. This is particularly significant when the apparatus is used for motor vehicles.

Moreover, as will be better understood by those skilled in the art the removal of soot from the engine can be effected at fixed intervals in a simple manner; with the solid particles being filtered out in accordance with one embodiment described herein. In this concept particles which have accumulated, for instance, in a filter bag (paper filter, metal filter, etc.) similar to a known vacuum cleaner bag, soot removal is effected by burning the soot from these bags or by burning the entire bags themselves. This can be done in a stationary incinerator without producing harmful emissions. The expense and uncertainty of operation which may arise in other systems, for instance because of filter clogging, are reliably avoided here at the least possible expense.

In contrast to the method of soot removal in which the filtered-out solid particles are delivered to the intake side of the engine for afterburning, this provision prevents the excess engine wear such recirculated solid particles causes.

A further embodiment of the invention makes it easier to service an engine operated with an apparatus according to the invention for removing solid particles from the exhaust gases. Servicing or soot removal at fixed intervals of operation becomes unnecessary. The energy required for the soot incinerating apparatus according to this invention is particularly low, because the resultant heat of combustion is exploited to increase the flammability of the solid particles to be incinerated. Another embodiment takes into account the reduced amount of oxygen available in the engine exhaust gas, by providing that the missing air is supplementally supplied, to the exhaust gas containing solid particles especially during full-load operation. In a further particularly advantageous manner, the ventilation of the crankshaft housing is utilized as the source of this air. The gas flowing out of the crankshaft housing contains sufficient oxygen, at the gas pressure required for its delivery to the exhaust gas which is itself under pressure.

The invention will be better understood and further objects and advantages thereof will become more apparent from the ensuing detailed description of preferred embodiments taken in conjunction with the drawings.

BRIEF DESCRIPTION OF THE DRAWINGS

FIG. 5 shows a first exemplary embodiment, having a second apparatus for afterburning of the precipitated solid particles with additional fuel.

DESCRIPTION OF THE PREFERRED EMBODIMENTS

Figure 1:
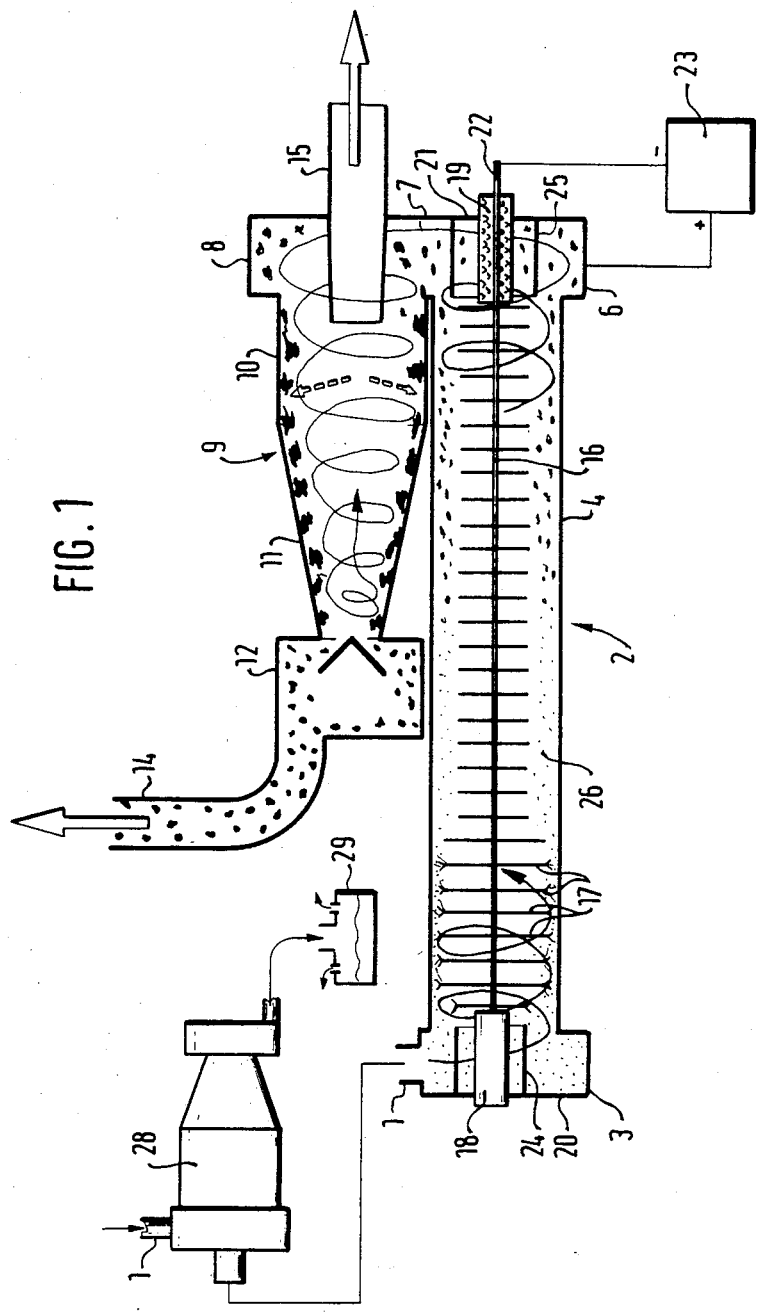
FIG. 1 shows a first exemplary embodiment of the invention.

The exhaust gas emitted by an internal combustion engine, not shown in detail in the drawings, to the exhaust gas collecting system is delivered via a connecting line 1 to an apparatus for removing solid particles from engine exhaust gases, hereinafter known in short as an electrostatic soot shunt 2. The connecting line 1 discharges at a tangent into a spiral housing 3, which is appended coaxially to the end of an elongated tube 4 such that it is open on the end adjacent to the tube diameter. On the other end of the tube, a second spiral housing 6 is appended, which is likewise open toward the interior of the tube 4 and is disposed coaxially therewith; a connection 7 leads off at a tangent from the spiral housing 6 and in turn discharges at a tangent into an inflow cylinder 8 of a centrifugal filter 9. The centrifugal filter 9, herein embodied as a cyclone precipitator, is located parallel to the axis of the tube 4 and in the conventional manner has the inflow cylinder 8, which is followed coaxially by a cylinder 10 of smaller diameter, which merges with a conically tapering element 11. This element 11 is followed by a collecting chamber 12 having an outlet 14. From the inflow cylinder 8 inward, an immersion tube 15 extends coaxially in the cylinder 10, from whence it carries relatively uncontaminated gas to the outside.

Extending coaxially into the tube 4 is an electrode support 16 of electrically conductive material, on which a plurality of electrode discharge disks 17 are lined up at regularly spaced intervals, with a multiplicity of shape edges or pointed tips being provided at their circumference. Hereinafter these disks 17 will be denoted spray disks. The electrode support 16 is joined at one end, via a high-voltage insulator 18, to the end wall 20 of the first spiral housing 3 and at the other end, via a high-voltage insulator 19, to the end wall 21 of the second spiral housing 6. The high-voltage insulator 19 further has a duct 22 by way of which the electrode support 16 is connected to a source 23 of high-voltage direct current. The other pole of the high-voltage source 23 is electrically connected to the electrically conductive wall of the tube 4. The high-voltage insulators 18 and 19 are also surrounded at a distance by a guard tube 24, 25, located coaxially with the axis of the tube 4, each guard tube being firmly connected to a respective end wall 20 and 21 and extending in the axial direction far enough that it projects beyond the width of the connecting line 1 and 7, respectively, but not beyond the high-voltage insulator 18 and 19, respectively. Between the inside diameter of the elongated tube 4 and the outer diameter of the spray disks 17 or of the guard tube 24, there is an annular chamber 26 of constant width, by way of which the exhaust gas can travel through the tube 4 without hindrance.

In terms of how it operates, the tube 4 with the spray disks 17 represents an electrostatic agglomerator. The exhaust gas arriving from the engine is introduced at a tangent, via the connecting line 1, into the spiral housing 3, from whence it emerges laterally, with a pronounced swirl flow, into the annular chamber 26, travels through the tube 4 in a helical pattern, and is introduced at a tangent, via the second spiral housing 6, into the inflow cylinder 8 of the cyclone precipitator 9. There the exhaust gas continues its swirl flow and reaches the cylinder 10 and the contiguous, conically tapering element 11. The major portion of the exhaust gas then flows back via the immersion tube 15, while a small portion of the exhaust gas flows out via the outlet 14.

The exhaust gas entering the connecting line 1, particularly when it is derived from Diesel engine exhaust gases, contains very finely distributed soot, with which other foreign substances or solid particles may be admixed as well. After its entry into the tube 4, the exhaust gas is exposed to a very intense electrical field, in which corona discharges are produced at the tips of the spray disks 17. The negative pole of the high-voltage source 23 is applied to the spray disks 17. The soot particles entering into the corona discharge become electrically charged artificially. The corona discharge travels in the annular chamber 26 between the spray disks 17 and the wall of the tube 4. Via intense electrostatic forces, strong collisions back and forth are induced among the charged soot particles. When they collide, the soot particles stick to one another and thus grow into larger and larger soot particles as they travel through the annular chamber 26.

In actuality, two collision processes may be distinguished here. One is a particle/wall collision process, which results when the electrically charged soot particles are accelerated away from the spray disks 17 toward the wall of the tube 4 by the electrostatic forces. The approaching soot particles collide at the wall with any soot particles that may already be adhering there, stick to them, and grow with them into larger soot particles against the wall. These larger particles discharge at the wall by an outflow of the charges via a thin layer of soot adhering to the wall, thereby lose their adhesion to the wall and are then torn away again, shortly after their having struck the wall, by the flow forces of the exhaust gas flowing through the tube. In so doing they again become electrically charged artificially, but in this case positively. These torn-away, larger soot particles are in turn artificially charged in the annular chamber 26 with the negative, free charge carriers from the corona discharge and are accelerated back toward the wall. The process of colliding with the wall starts all over again.

A particle/particle collision process takes place as well. The soot particles negatively charged by the spray disks and torn away from the wall of the tube 4 and then positively charged strike one another as they travel about the annular chamber and stick together by electrostatic and mechanical adhesion forces. The charge of the enlarged soot particles is then reversed once again by electrically charged soot particles or by free charge carriers, and depending upon whether the charge is positive or negative they are accelerated toward either the spray disk or the tube wall. This collision process is highly intensified by the charge of the particles, because the collision cross section is increased far beyond the particle cross section as a result of the strong attraction via Coulomb forces.

Deviating from electrostatic filters of known design, the electrostatic soot shunt described here is dimensioned such that the exhaust gas speed in the annular chamber amounts to more than 2.5 m/sec, and is preferably at least 5 m/sec. This gas speed can be increased to up to 30 m/sec. The upper limit may be considered to be that at which the stability of the corona discharge is destroyed by the high gas speed.

The high flow speeds dictate that the soot particles have only a fleeting contact with the wall of the tube 4, because they are immediately torn away from it again by the flow forces. Thus no growing deposits are formed, and there is no settling out of soot within the tube 4. This electrostatic part serves solely to induce an intensive collision process among the soot particles and to cause the very small soot particles to grow together into large soot particles. These large particles leave the tube 4 along with the exhaust gas and then arrive in the cyclone precipitator 9. There, under the influence of centrifugal force and an accelerated rotational movement, they are precipitated out at the walls of the cyclone precipitator and they travel together with a small partial flow of exhaust gas to the collecting chamber 12. The exhaust gas located in the core of the cyclone precipitator flows via the immersion tube 15, in the form of scrubbed exhaust gas, to the outside, where it can flow into the open air, via an interposed muffler as the case may be. The partial flow of exhaust gas that leaves via the outlet 14 is contrarily very heavily loaded with the precipitated soot particles and then can either travel to a collecting tank or, preferably, for the sake of advantageous soot removal from the apparatus, be recirculated to the intake side of the engine. This is advantageous because in order to improve exhaust emissions, engines used for motor vehicle operation are already being operated with exhaust gas recirculation, particularly in order to reduce the $NO_x$ components. The recirculated exhaust gas carries the precipitated soot along with it, which can then be afterburned in the engine combustion chambers.

Because a flow speed ten times greater than that in conventional electrostatic filters can be used, the particles in the exhaust gas are no longer precipitated out in the filter, but instead are merely transformed into larger particles as they pass through it. An essential factor is that the particles are carried over relatively long distances with this high flow speed between two field electrodes, that is, the spray disks 17 and the wall of the tube 4, at different polarities, so that by repeated charge reversals the particles collide with one another as often and as repeatedly as possible. The process of particle enlargement is intensified by the high flow speed, since the particles are more uniformly electrically charged, because of the increased flow turbulence inside the corona discharge zones, than is the case at lower gas speeds. The electrostatic soot shunt can thus be operated with smaller charge excesses and hence with less high-voltage power. Furthermore, the number of collisions between the particles is increased as compared to conventional filters, because the particle/particle collision processes are only made possible by the frequently repeated actions of tearing the particles away from the wall.

The use of high exhaust gas speeds inside the tube enables the construction of an electrostatic soot shunt which is substantially better adapted for use in a motor vehicle, in terms of its structural shape and volume and its functional reliability, than other filters which operate with lower flow speeds. Because of the axially parallel position of the cyclone precipitator, the structure is relatively flat, enabling it to be mounted under the floor of the motor vehicle; its structural size in terms of shape and volume are comparable to those of a muffler. With the high flow speed provided and an induced swirl flow, the exhaust gas flow can be uniformly distributed to the narrow annular chamber 26. Diffusors or similar critical flow elements need not be used, so short-circuit flows in the tube 4 as eliminated. The volume of the tube is utilized fully.

The high flow speed also assures that no soot is deposited in the tube, and the tube is continuously cleaned of soot. Thus an abrupt expulsion of relatively large quantities of soot that would have accumulated in the meantime is avoided. Such an expulsion would cause a brief overloading of the cyclone precipitator, which in turn would cause an increase, at intervals, in the soot concentration both in the exhaust gas emerging via the immersion tube and in that leaving via the outlet 14. Not only would this add to environmental pollution, but the process of fuel combustion would also be affected negatively, then taking a jerky or pulsating course. The uniform removal of soot from the tube 4 also means that a steadily growing layer of soot is prevented from forming on the two electrodes during the course of operation; this would otherwise decrease the spacing between the electrodes. As a consequence, the tendency to electrical arcing is greatly reduced, and brief, repeated failures caused by voltage surges are thereby avoided.

The structural arrangement makes it possible to effect a pronounced swirl in the exhaust gas inside the tube 4, which in turn improves the operational reliability of the high-voltage insulation. In the center of the swirl flow, in the vicinity of the high-voltage insulators 18 and 19, the proportion of soot in the exhaust gas is considerably reduced, because the soot particles are spun outward and away by the pronounced swirl flow. The high flow speed also prevents the formation of thick soot layers on the insulator itself. The insulators thus become less dirty, so that their calculated leakage resistances are maintained during the operation of the apparatus. The voltage penetration or arcing resistance and operational reliability of the insulators means that the power requirement for the electrostatic soot shunt can be kept relatively small.

Since not only soot but also incombustible solid components, such as rust, worn-away material, ashes and the like, are also found in the exhaust gas of internal combustion engines, including self-igniting engines, these particles can cause increased engine wear if they are recirculated directly into the combustion chambers of the engine. A further feature of the invention accordingly provides that an additional cyclone precipitator 28 can be disposed upstream of the mouth of the connecting line into the spiral housing 3. In this cyclone precipitator 28, these heavier particles are precipitated out of the exhaust gas. The precipitated particles may either be carried to a bin 29 or fed into the open air together with a portion of the exhaust gas amounting to from 1 to 2% of the total flow of exhaust gas. Since only a very small quantity is involved, the precipitation efficiency of the overall apparatus is not decreased substantially. The result is that only the primary load of particles in the exhaust gas, which comprises soft, combustible soot particles, is delivered to the engine combustion chambers.

Figure 2:
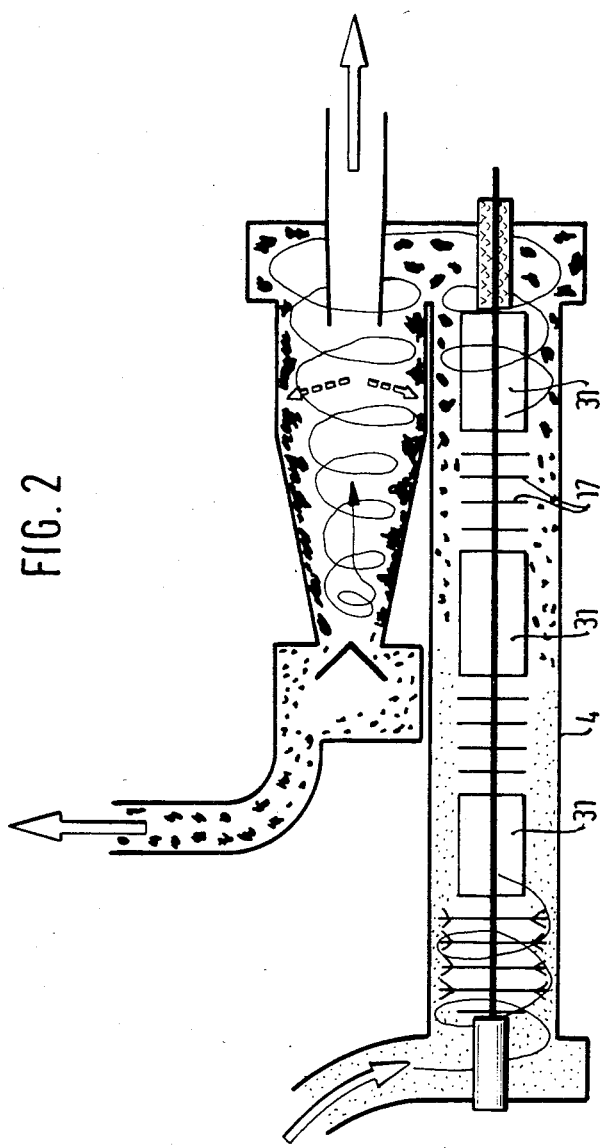
FIG. 2 shows a second exemplary embodiment of the invention.

FIG. 2 shows a modified embodiment of the electrostatic soot shunt of FIG. 1, where the spray disks 17 are replaced at intervals with cylindrical electrodes 31. Otherwise the apparatus is identical to that shown in FIG. 1. With this arrangement, the same efficiency is attained in terms of the enlargement of particle size, given the same structural size of the apparatus. The electrical power requirement, however, is reduced by this apparatus, because only one electrostatic field, without a burning corona discharge, is generated in the vicinity of the cylindrical electrodes 31. Because spray disks 17 are provided first at the entrance of the exhaust gas into the tube 4, which are then followed in alternation by cylindrical electrodes 31 and further spray disk sections 17, and these are followed at the end of the tube by a cylindrical electrode 31, the soot particles in the exhaust gas are initially charged electrically upon their entry into the tube 4. Simultaneously, an intensive particle/wall collision process is thereby induced. At the end of the spray disk segment and at the entrance into the first field segment in the vicinity of the cylindrical electrode 31, electrically charged particles having both polarities are present. These particles are accelerated by the field forces toward electrodes having the correspondingly opposite charge. The particles arriving there are discharged and re-charged oppositely, once they are torn away again from the wall by the flow forces of the exhaust gas flow. By means of this charge-reversal process in the pure field area, particles of both positive and negative charge are present over relatively long distances, so that the process of particle/wall collision can be repeated continually, and the particles can combine into larger particles, with the same success as in the exemplary embodiment of FIG. 1. In the field area, contrarily, a smaller flow is present that in the area of the corona discharges of the spray disk segment, because in the field area only the charges adhering to the soot particles, but not any free excess charges, need to be transported. The sequence of segments having spray disks and segments having cylindrical electrodes 31 has the advantage that if neutral soot particles form during the particle/particle collision process in the vicinity of the field segments, they again become artificially charged in the vicinity of the corona discharge of the spray disk segment. The collision processes are subsequently intensified anew, so that with the shortest possible travel times through the tube or with a short structural length of the tube, the largest possible particles are created.

Figure 3:
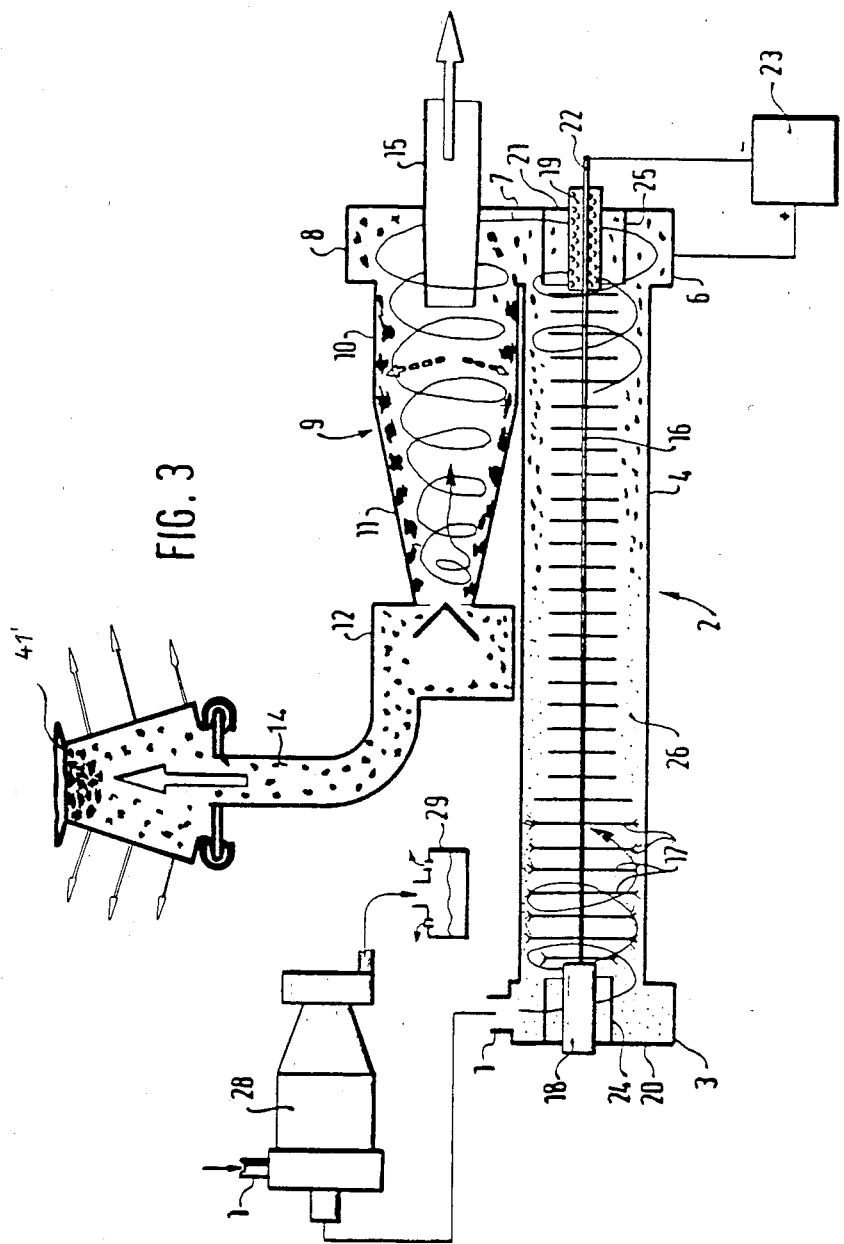
FIG. 3 shows a third exemplary embodiment of the invention, having a first apparatus for removing the precipitated solid particles.

In FIG. 3, based on the exemplary embodiment of FIG. 1, a paper collecting bag is shown as an example of a collecting container 41, into which the outlet 14 of the centrifugal precipitator 9 discharges. This container is embodied as a removable collecting bag 41'. The soot and other solid components precipitated out by the centrifugal precipitator are then delivered, not to the intake side of the engine, but to this filter, which functions similarly to the paper bag used in vacuum cleaners. As soon as the bag is full, it can be removed and replaced. The capacity of the bag is selected such that it can be exchanged for a new, empty collecting bag on the occasion of other interruptions in engine operation that are required in any event, such as refilling the gasoline tank or the end of a day's trip. The full bags can then be incinerated in a stationary system without polluting the environment. This provision is advantageously usable for instance with commerical or industrial vehicles such as fork lift trucks, busses, construction machinery or the like. Naturally the filter can be made of some other, incombustible material, in which case the waste must be removed in some other manner. With the manner of soot removal selected here, engine wear which can otherwise occur when the precipitated solid particles are recirculated to the intake side of the engine is reliably avoided. As compared to conventional filter systems which use porous walls, this provision eliminates the danger of clogging, which is associated with a not inconsiderable functional unreliability and necessitates great monitoring effort.

Figure 4:
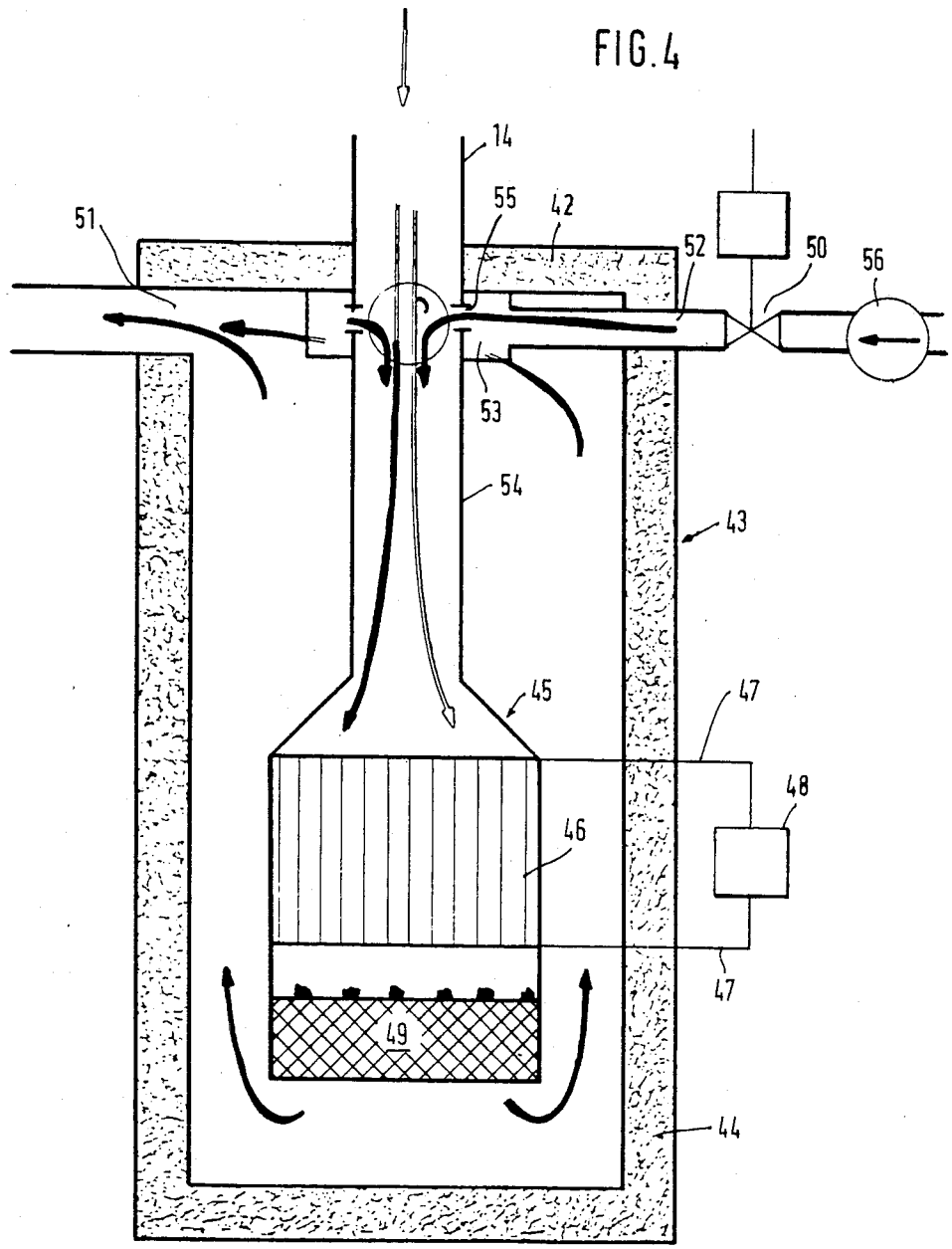
FIG. 4 shows a fourth exemplary embodiment of the invention, having a first apparatus for afterburning of the precipitated solid particles.

In the exemplary embodiment of FIG. 4, the outlet 14 of the centrifugal precipitator 9 leads into a soot incinerating device 43, which comprises a housing 44 into which a combustion chamber 45 is inserted. The extended portion of the outlet 14 protrudes coaxially, in the form of an immersion tube 54, from one front end 42 into the housing 44 and there discharges into the combustion chamber 45. The combustion chamber 45 has an electrical heating body 46, which is supplied via electrical connecting line 47 from a current source 48 located outside the housing 44. The combustion chamber 45 is open on the side remote from the outlet 14, toward the bottom of the housing 44, and at this point has a filter 49 positioned adjacent to the heating body 46. The housing 44 has its outlet at the front end 42. An exhaust gas line 51 leads radially away from the housing 44 at this end, and a combustion air supply line 52 also discharges into the housing from the side at this end, leading to an annular chamber 53 surrounding the immersion tube 54 at the front end 42. Between the annular chamber 53 and the interior of the immersion tube 54, air inlet openings 55 are provided, by way of which the combustion air is admixed with the exhaust gas which is delivered, loaded with solid particles, from the direction of the outlet 14 into the combustion chamber 45. The immersion tube 54 thus also acts as a mixing chamber where the supplied combustion air is mixed with exhaust gas.

The embodiment according to FIG. 4, described above, functions as follows:

The combustion chamber is kept at ca. 500°-600° by the electrical heating device; this temperature suffices to bring the solid particles delivered with a small flow of exhaust gas up to the temperature of combustion. Soot particles which however have not yet burned in the vicinity of the electrical heating body 46 are intercepted in the following filter 49. The filter, which has been heated by the gas flow, also has a sufficiently high temperature for soot combustion, so that soot particles intercepted there are subsequently burned up completely. The scrubbed gas emerging from the filter at its outlet then flows back to the front end 42, (as indicated by the arrows) encompassing the combustion chamber 45 and the immersion tube 54 in a countercurrent flow, and then leaves the incinerating device via the exhaust gas line 51. This results in a considerable recovery of heat for the combustion chamber 45, which greatly lessens the electrical heater output that is required. The housing 44 is advantageously well insulated in terms of heat, so that here again the heat loss is kept quite low.

Since in full-load engine operation the exhaust gas contains very little oxygen, it is suitable to add air to this exhaust gas via the air supply line 52, especially in full-load operation and controlled by means of a valve 50 actuated in accordance with engine operating parameters. This air can be furnished by an air pump 56, which furnishes the required higher pressure above the pressure of the exhaust gas. Instead of being drawn from the pump 56, however, the combustion air can be drawn from the crankcase housing of the engine, since the gas leaving the crankcase housing is likewise at a slightly higher pressure, and the gas escaping from the crankcase housing contains sufficient oxygen, as well as carbon, which are also combusted in the combustion chamber 45, producing heat. This has the effect of reducing the required electrical heating output.

For larger internal combustion engines, such as those used for commercial vehicles, the required electrical heating output may perhaps become undesirably high. In that case, as provided by the exemplary embodiment shown in FIG. 5, a catalytic element 57 is incorporated in the combustion chamber 45, following the electrical heating body 46 and located between the heating body 46 and the filter 49. This catalytic element lowers the minimum temperature that is required for combustion of the solid particles. A fuel line 59 also discharges into the immersion tube 54'; by way of this line 59, fuel is admixed with the exhaust gas and the supplied air. The quantity of the supplied fuel can be adjusted via a metering device 60. The mixture of exhaust gas, air, fuel and soot particles now delivered to the combustion chamber 45 needs to be brought only to the lower response temperature of the catalytic element. The actual heating of the combustion chamber to a temperature of from 500° to 600° is effected by the catalytic combustion of the fuel and also of the soot itself.

With an appropriate selection of materials, the electric heating body, the catalyst carrier and the filter may comprise a single workpiece, for instance a "catalyst-coated", electrically conductive ceramic foam. In this exemplary embodiment, the soot and all the precipitated, combustible components are combusted continuously. Should the system fail, however, engine operation will not be disrupted, because the apparatus provided here does not affect the engine; for instance, it does not generate a load-dependent counterpressure such as is usually the case in ceramic filter systems disposed in the exhaust gas. The auxiliary energy requirement, in the form of current or fuel, is very small. Since the apparatus combusts the incident soot continuously, a control means to provide intervals of soot burn-off is not needed. Especially when the ventilation from the crankcase is used for the supply of additional combustion air, the energy required for an air pump and also for furnishing such an air pump can be spared, which reduces the costs of the system.

The foregoing relates to preferred exemplary embodiments of the invention, it being understood that other variants and embodiments thereof are possible within the spirit and scope of the invention, the latter being defined by the appended claims.

What is claimed and desired to be secured by Letters Patent of the United States is:

1. An apparatus for removing solid particles from an exhaust gas of an internal combustion engine comprising a housing having an axis and provided with an inlet end for reception of said exhaust gas and an outlet end for communication with a centrifugal precipitator, said centrifugal precipitator having a tangential inlet at one end of a cylindrical part, said cylindrical part merges with a tapered body arranged to form a solid particle outlet, said cylindrical part further including an axis arranged to receive an immersion tube, said immersion tube arranged to extend into said cylindrical part and to carry away scrubbed gas, said housing further including an inner wall and high voltage means insulated from said housing, said high voltage means arranged to extend coaxially with said axis of said housing, and said high voltage means further includes disk means secured to said high voltage means and disposed seriatim and relatively close to one another and to said wall of said housing, said spray disk means being connected via said high voltage means with a first pole of a high-voltage source, and a second pole being connected to said housing, means including said inlet to said housing and the spacing between said disk means and said wall to produce a pronounced swirl in the exhaust gas between said disk means and said housing wall, said swirl having an average speed of more than 2.5 m/sec.

2. An apparatus as defined by claim 1, further wherein said inlet end of said housing futher includes a connecting line which transports exhaust gas tangentally into the housing, and at the outlet end of said housing a tangential connection is provided in communication with said tangential inlet, and further that said high voltage means is supported as opposite ends in spaced insulating elements which are affixed to end walls of said housing, a guard tube interposed between said end walls, said guard tube being open toward the interior of said housing and arranged to extend over at least the width of said tangential connection.

3. An apparatus as defined by claim 1, further wherein said centrifugal precipitator is disposed parallel with and immediately adjacent to said housing.

4. An apparatus as defined by claim 2, further wherein said centrifugal precipitator is disposed parallel with and immediately adjacent to said housing.

5. An apparatus as defined by claim 1, further wherein said high voltage means further includes a segmental arrangement of cylindrical electrodes and spray disks, which are disposed in repeated succession on said high voltage means.

6. An apparatus as defined by claim 5, further wherein said spray disks and said cylindrical electrodes are correlated one after the other on said high voltage means beginning with at least one of said spray disks and terminating with a cylindrical electrode.

7. An apparatus as defined by claim 1, further wherein a filter means is disposed in said connecting line leading to the said housing.

8. An apparatus as defined by claim 7, further wherein said filter means comprises a centrifugal filter.

9. An apparatus as defined by claim 1, further wherein said solid particle outlet leads to an intake of an i.c. engine.

10. An apparatus as defined by claim 1, further wherein said solid particle outlet communicates with a collecting container.

11. An apparatus as defined by claim 10, further wherein said collecting container comprises a removable filter.

12. An apparatus as defined by claim 11, further wherein said filter comprises combustible material.

13. An apparatus as defined by claim 10, further wherein said filter is accommodated in a muffler housing.

14. An apparatus for removing solid particles from internal combustion engine exhaust gases having an outlet for scrubbed exhaust gas and an outlet for removed solid particles, in particular as defined by claim 1, further wherein said solid particle outlet leads to a soot incinerating device including another housing.

15. An apparatus as defined by claim 14, further wherein said soot incinerating device has a combustion chamber and said combustion chamber includes an electrically heated body.

16. An apparatus as defined by claim 15, in that the combustion chamber further includes an open outlet and a filter is disposed between said heating body and said outlet.

17. An apparatus as defined by claim 16, further wherein said combustion chamber is inserted in a housing said last-named housing insulated against emitting heat to the outside, and further that gases leaving said outlet of said combustion chamber flow countercurrent to a further outlet which is located in a zone that is in proximity to the entrance of said solid particle outlet into said other housing.

18. An apparatus as defined by claim 14, further wherein an air supply line which communicates with an air pressure source discharges at said inlet side of said combustion chamber.

19. An apparatus as defined by claim 18, further wherein said air supply line further includes a valve controllable in accordance with engine operating parameters.

20. An apparatus as defined by claim 19, further wherein said air supply line is opened during full-load operation of said engine.

21. An apparatus as defined by claim 18, further wherein said air supply line communicates with a crankcase ventilation means of said engine.

22. An apparatus as defined by claim 18, further wherein said solid particle outlet communicates with a mixing chamber which is in proximity to said combustion chamber.

23. An apparatus as defined by claim 22, further wherein a catalytically active element is disposed in said combustion chamber downstream of a heating body.

24. An apparatus as defined by claim 23, further wherein a fuel line in which a metering device is disposed discharges into said mixing chamber.

25. An apparatus as defined by claim 23, further wherein said heating body, said catalytically active element, and said filter are embodied in a unitary device and comprise a catalytically-coated, electrically conductive ceramic foam.

* * * * *